May 2, 1939.  H. W. HAFER  2,156,850
TRAILER BED
Filed May 25, 1938  3 Sheets-Sheet 1
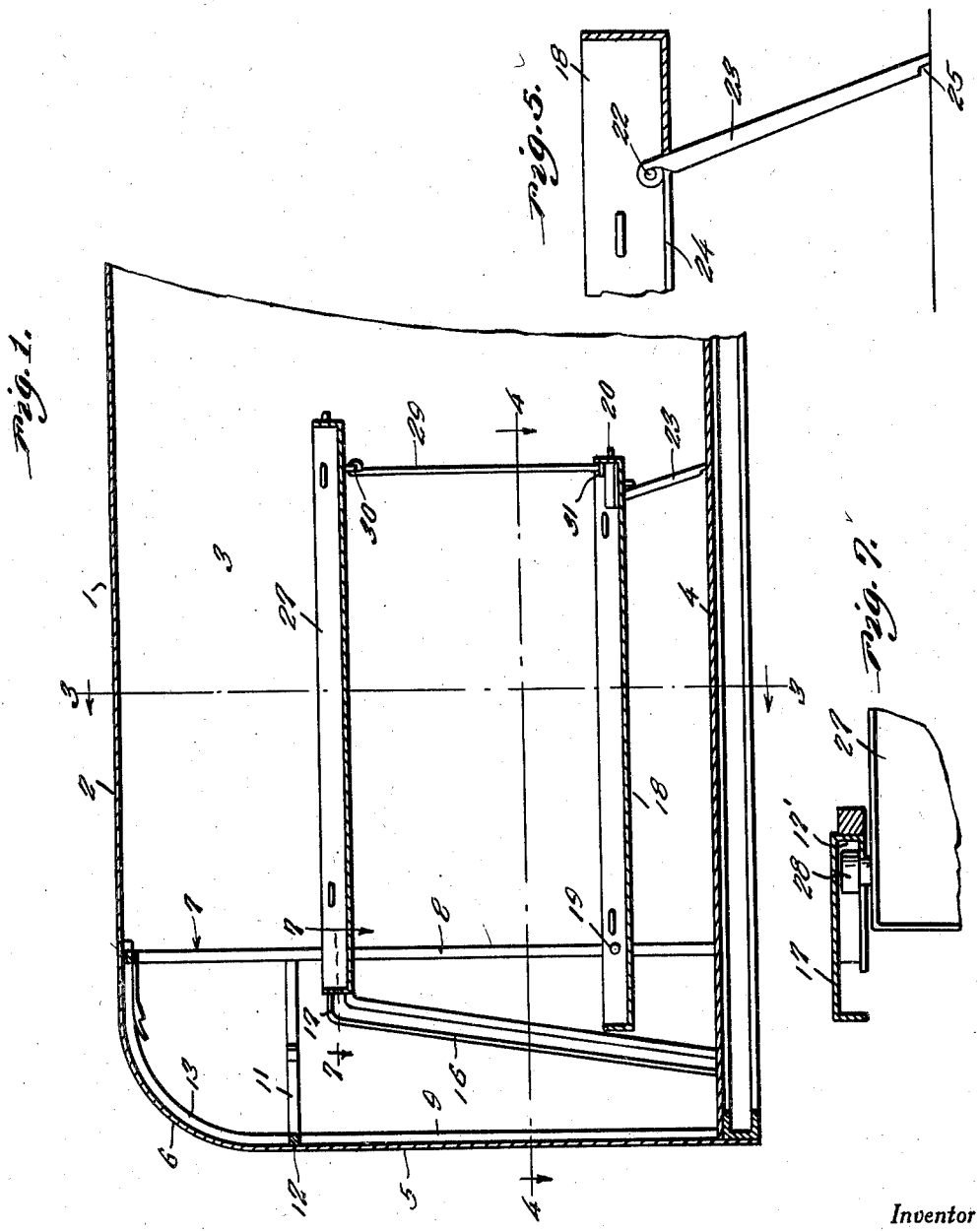
Inventor
H. W. Hafer
By Clarence A. O'Brien
and Hyman Berman
Attorneys

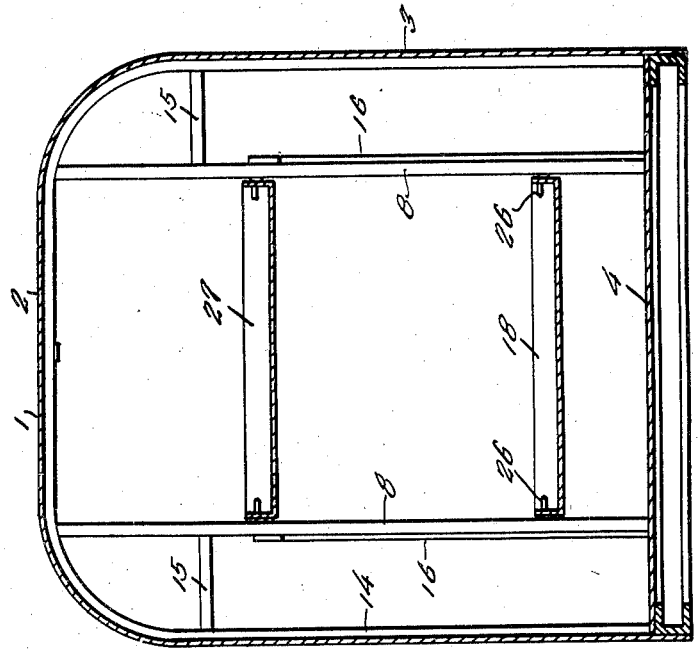

May 2, 1939.  H. W. HAFER  2,156,850
TRAILER BED
Filed May 25, 1938   3 Sheets-Sheet 3
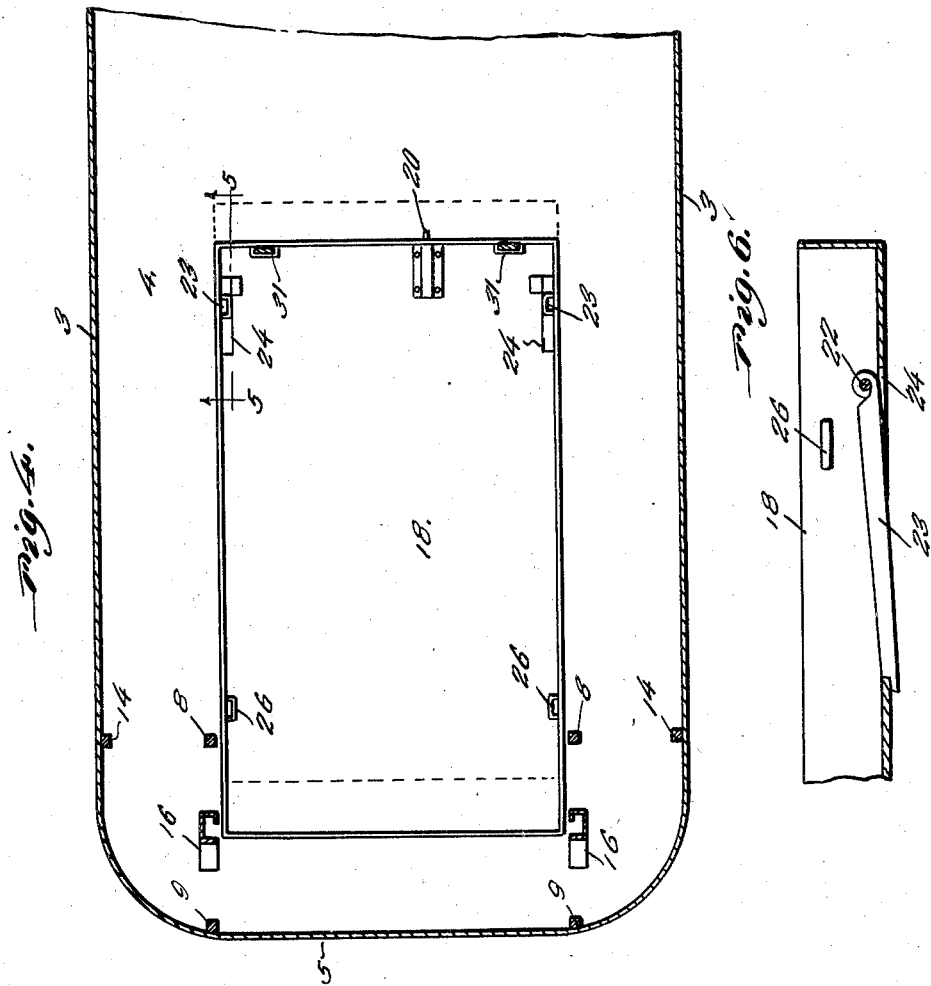
Inventor
H. W. Hafer
By Clarence A. O'Brien
and Hyman Berman
Attorneys Patented May 2, 1939

2,156,850

UNITED STATES PATENT OFFICE 2,156,850

TRAILER BED

Harry W. Hafer, Winnett, Mont.

Application May 25, 1938, Serial No. 210,053

3 Claims. (Cl. 5—9)

My invention relates to improvements in folding beds for use more particularly in trailers.

The invention is designed with the particular object in view of equipping a trailer body inexpensively with a double-deck bed which may be easily and quickly folded into compact form and stable condition, and readily unfolded when desired.

To the accomplishment of the above, and subordinate objects presently appearing, a preferred embodiment of my invention has been illustrated in the accompanying drawings, set forth in detail in the succeeding description, and defined in the claims appended hereto.

In said drawings:

Figure 1 is a fragmentary view in longitudinal vertical section of a trailer body equipped according to my invention, the bed being shown unfolded, Figure 2 is a similar view showing the bed folded, Figure 3 is a view in vertical transverse section taken on the line 3—3 of Figure 1 looking in the direction indicated by the arrows, Figure 4 is a view in horizontal section taken on the line 4—4 of Figure 1 looking downwardly as indicated by the arrows, Figure 5 is a fragmentary view in section taken on the line 5—5 of Figure 4 looking in the direction indicated by the arrows and illustrating one of the folding legs of the lower deck in unfolded position, the parts being drawn to an enlarged scale, Figure 6 is a similar view illustrating said leg as folded, and Figure 7 is a detail view in horizontal section taken on the line 7—7 of Figure 1 looking downwardly as indicated by the arrows and drawn to an enlarged scale.

Referring to the drawings by numerals, the bed of my invention has been shown as equipment of a trailer body 1, of the usual type, including a top 2, sides 3, a floor 4, and a rear end 5 rounding, as at 6, into the top 2.

According to my invention, a pair of laterally spaced, upstanding parallel frames 7, preferably of bar-like material, are fitted into the rear of the body 1 upon opposite sides of the longitudinal center thereof, respectively, in spaced relation to the sides 3 and parallel therewith, each frame including a front bar 8 and a rear bar 9, an upper horizontal brace bar 11 connecting each front and rear bar, and a similar brace bar 12 connecting the rear bars. The rear bars 9 extend from the floor 4 to the top 2 and have rounded forwardly extending upper ends 13 fitting against the rounded part 6 of the rear end 5 and the top 2. The terminals of said upper ends 13 are suitably connected to a bow 14 also of bar-like material and which arises from the floor 4 and extends upwardly along the sides 3 and across the top 2, said bow being suitably secured to said floor, sides, and top, as desired. The lower ends of the front and rear bars 8 and 9 may be anchored to the floor in any suitable manner and the upper ends of the front bars 8 to the top of the bow 14. Upper horizontal brace bars 15 connect the front bars 8 to the bow 14.

Upstanding from the floor 4 in substantially the plane of each frame 7 is a channeled guide 16 inclining slightly forwardly for a purpose presently seen and having at its front upper end a horizontal forwardly extending head 17 having the channel therein closed at its terminal as at 17'. The guides 16 are arranged with their channeled sides innermost.

The front bars 8 of the frames 7 support therebetween a lower deck, or bed, 18, of shallow, boxlike, rectangular form and any suitable material, and which has its sides pivoted adjacent the rear end of the deck to said bars 8, as at 19, so that it may be unfolded to extend forwardly of said bars 8, or folded into vertical position substantially parallel with said bars 8. As will be understood, the length of the deck 18 is such that its front end will just clear the top of the bow 14. The front end of the deck 18 is equipped with a latch bolt 20 of the usual spring-projected type adapted, in the described folded position of said deck, to snap into an aperture 21 in the top of said bow 14, whereby said deck is releasably retained in folded position.

Adjacent its front end the lower deck 18 has pivoted to the sides thereof, as at 22, a pair of folding legs 23 adapted to be swung outwardly of said deck into unfolded position through slots 24 in the bottom of the deck and whereby said deck when unfolded is supported at its front end on the floor 4. The legs 23 when unfolded engage the front ends of the slots 24 whereby the unfolded position of said legs is established. The outer ends of the legs 23 are notched, as at 25, so that when said legs are swung inwardly, said notches engage the rear ends of the slots 24 to establish folded position of the legs and frictionally lock the same in folded position. At suitable points along the sides thereof the deck 18 has inwardly extending staple-like members 26 secured thereto for tying a mattress to the deck.

An upper deck, or bed, 27, a counterpart of the deck 18, minus the latch 20, legs 23, and slots 24, is mounted in the guides 16 for folding and unfolding as follows: A pair of rollers, one of which is shown at 28, are mounted upon opposite sides of said deck 27, respectively, adjacent the rear end thereof, said rollers fitting in the channels of said guides 16 to roll therein. In the unfolded position of the lower deck 27 the rollers 28 are located in the heads 17 of the guides 16, whereby the rear end of said deck 27 is supported as will be clear. The front end of said upper deck 27 is supported, when it is unfolded, by a pair of bar-like front legs 29 pivotally mounted on the bottom of said deck, on opposite sides of the latter, respectively, by means of eye bolts 30 on said bottom, the arrangement being such that said legs 29 are freely swingable forwardly and rearwardly. A pair of socket members 31 on the front end of the lower deck 18 receive the lower ends of the legs 29, whereby the upper deck 27 is supported in horizontal position and locked to the lower deck 18 against rearward movement.

In folding the upper deck 27, the legs 29 are first lifted from the sockets 31 and said deck then shoved rearwardly until the rollers 28 move out of the heads 17 of the guides 16. At this point the rear end of the deck 27 gravitates downwardly and rearwardly in the guides 16 to the floor 4. During such gravitation of said deck 27 the front end of the deck is swung upwardly until said deck is in a slightly forwardly inclined position. At this point a resilient catch 32 suitably secured to the top of the bow 14 snaps over a lug 33 on the front end of the upper deck 27 and latches said deck in the described folded position. In the folded position of said upper deck 27, the legs 29 swing into vertical position close to said deck. The lower deck 18 may then be folded in the manner already described.

In unfolding the decks 18 and 27, the lower one 18 is first swung downwardly into unfolded position and the upper one then swung downwardly by grasping the front end thereof and pulling forwardly thereon, whereupon the rollers 27 will ride up the inclined guides 16 into the heads 17 thereof. The legs 29 may then be inserted in the sockets 31 in the manner previously described. A cross-bar 34 extending between the brace bars 11 prevents the movement of the upper deck 27 rearwardly from its folded position.

The foregoing constitutes a detailed description of a preferred embodiment of my invention and it is believed that the invention will be readily understood therefrom without further explanation.

Manifestly, the invention, as described, is susceptible of modification without departing from the inventive concept and right is herein reserved to such modifications as fall within the scope of the subjoined claims.

What I claim is:

1. The combination with a trailer body having a floor, sides and top, respectively, of a folding bed comprising a pair of laterally spaced frames secured to said floor in upstanding position to extend parallel with the sides of said body, a rectangular box-like deck pivoted adjacent one end thereof to said frames to swing therebetween into vertical and horizontal positions, respectively, a pair of folding legs pivotally mounted on said deck adjacent the other end thereof to be extended from said deck and support said other end on said floor, a pair of elongated channeled guides secured to said floor in upstanding position alongside said frames, respectively, a second deck similar to the first-mentioned deck having a pair of rollers mounted upon opposite sides of the same adjacent one end thereof and rolling in said guides whereby said second deck may be manipulated in said guides into horizontal position over said first-mentioned deck, or swung and lowered in said guides into upright position behind said first-mentioned deck, and means to support said second deck in horizontal position including lateral extensions on said guides for receiving said rollers, and legs on said second deck manipulative to seat the same on the first-mentioned deck.

2. The combination with a trailer body having a floor, sides and top, respectively, of a folding bed comprising a pair of laterally spaced frames secured to said floor in upstanding position to extend parallel with the sides of said body, a rectangular box-like deck pivoted adjacent one end thereof to said frames to swing therebetween into vertical and horizontal positions, respectively, a pair of folding legs pivotally mounted on said deck adjacent the other end thereof to be extended from said deck and support said other end on said floor, a pair of elongated channeled guides secured to said floor in upstanding position alongside said frames, respectively, and connected at the upper ends thereof to said frames, a second deck similar to the first-mentioned deck having a pair of rollers mounted upon opposite sides of the same adjacent one end thereof and rolling in said guides whereby said second deck may be manipulated in said guides into horizontal position over said first-mentioned deck, or swung and lowered in said guides into upright position behind said first-mentioned deck, means to support said second deck in horizontal position including lateral extensions on said guides for receiving said rollers, and coacting devices on said first and second mentioned decks for supporting the other end of the second mentioned deck on the first mentioned deck at will.

3. The combination with a trailer body having a floor, of a folding bed comprising a pair of laterally spaced frames secured to said floor in upstanding position to extend parallel with the sides of said body, a deck pivoted adjacent one end thereof to said frames to swing therebetween into vertical and horizontal positions, respectively, a pair of folding legs pivotally mounted on said deck adjacent the other end thereof to be extended from said deck and support said other end on said floor, a pair of elongated channeled guides secured to said floor in upstanding position alongside said frames, respectively, a second deck having a pair of trunnions mounted upon opposite sides of the same adjacent one end thereof and disposed in said guides whereby said second deck may be manipulated in said guides into horizontal position over said first-mentioned deck, or swung and lowered into said guides into upright position behind said first-mentioned deck, and means to support said second deck in horizontal position including lateral extensions on said guides for receiving said trunnions, and legs on said second deck manipulative to seat the same on the first mentioned deck.

HARRY W. HAFER.